(12) United States Patent
Miyazaki (10) Patent No.: US 8,301,688 B2
(45) Date of Patent: Oct. 30, 2012

(54) SERVICE SERVER (75) Inventor: Takao Miyazaki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 2793 days.

(21) Appl. No.: 10/255,626

(22) Filed: Sep. 27, 2002

(65) Prior Publication Data

US 2003/0061281 A1    Mar. 27, 2003

(30) Foreign Application Priority Data

Sep. 27, 2001   (JP) ................................. 2001-296112

(51) Int. Cl.
  *G06F 15/16*   (2006.01)
  *G06Q 30/00*   (2012.01)
(52) U.S. Cl. ..................... 709/203; 705/14.1; 705/26.35
(58) Field of Classification Search .................... 709/203
  See application file for complete search history.

(56) References Cited

U.S. PATENT DOCUMENTS

| | | | | |
|---|---|---|---|---|
| 5,970,475 | A * | 10/1999 | Barnes et al. ................... | 705/27 |
| 6,032,130 | A * | 2/2000 | Alloul et al. .................... | 705/27 |
| 7,167,855 | B1 * | 1/2007 | Koenig ............................. | 707/3 |
| 2001/0003180 | A1 * | 6/2001 | Sakai et al. ..................... | 705/40 |
| 2001/0037266 | A1 * | 11/2001 | Schroeder ....................... | 705/27 |
| 2002/0002515 | A1 * | 1/2002 | Okazaki et al. ................. | 705/27 |
| 2002/0016748 | A1 * | 2/2002 | Emodi et al. .................... | 705/26 |
| 2002/0069176 | A1 * | 6/2002 | Newman .......................... | 705/53 |
| 2002/0099653 | A1 * | 7/2002 | De Souza et al. ............... | 705/40 |
| 2002/0129108 | A1 * | 9/2002 | Sykes, Jr. ........................ | 709/206 |
| 2002/0135794 | A1 * | 9/2002 | Rodriguez et al. ........... | 358/1.15 |

FOREIGN PATENT DOCUMENTS

JP    11-203360 A    7/1999

* cited by examiner

*Primary Examiner* — Ranodhi Serrao
(74) *Attorney, Agent, or Firm* — Birch, Stewart, Kolasch & Birch, LLP (57) ABSTRACT

A service server can be operated in a more practical rate structure by extending the storage period and/or reducing the recording fee for information having a high utilization factor, or increasing the recording fee for information with a low utilization factor among the information stored in the service server. The service server includes a receiving device which receives the image information from a communication device on the information supplier side and records a recording fee of the received information, a transmitting and receiving device which transmits the information recorded in the recording device to a communication device on the information demander side upon an information service request from the information demander side, a counting device (information processing device) which counts an information service number from the information demander side, a recording device which records the counted information service number to be associated with the information supplier, and a recording fee calculating device (information processing device) which calculates a recording fee by reducing or increasing the recording fee recorded in the recording device.

1 Claim, 5 Drawing Sheets

| SERVICE SITUATION FILE | | | | |
|---|---|---|---|---|
| IMAGE FILE NAME | RECORDING FEE OF LAST MONTH | SERVICE NUMBER OF PRESENT MONTH | PRINT NUMBER OF PRESENT MONTH | RECORDING FEE OF PRESENT MONTH |
| a.jpg | 0 | 30 | 15 | 0 |
| b.jpg | 50 | 10 | 5 | 30 |
| c.jpg | 30 | 0 | 0 | 50 |
| SOUND FILE NAME | RECORDING FEE OF LAST MONTH | SERVICE NUMBER OF PRESENT MONTH | | RECORDING FEE OF PRESENT MONTH |
| a.mod | 0 | 80 | | 20 |
| INFORMATION FILE NAME | RECORDING FEE OF LAST MONTH | SERVICE NUMBER OF PRESENT MONTH | | RECORDING FEE OF PRESENT MONTH |
| a.htm | 0 | 123 | | 0 |
| b.htm | 50 | 12 | | 18 |

¥ SERVICE SITUATION

INFORMATION SUPPLIER A

INFORMATION SUPPLIER B

INFORMATION SUPPLIER C

FIG.5

SERVICE SERVER

BACKGROUND OF THE INVENTION

1. Field of the Invention

The present invention relates to a service server, and more particularly, to a service server which receives an image and other information from a communication device on the information supplier side, stores the received information, and provides it to a communication device on the information demander side for counter value.

2. Description of the Related Art

The conventional image management server has a definite storage period for an image uploaded from the image supplier side and a limited recording capacity.

A network photo-service system in which an image at the expiration of storage period among the images supplied for a network photo-service is deleted efficiently from the system without troubling the system administrator or operator was disclosed in Japanese Patent Application Publication No. 11-203360.

However, the conventional network photo-service system as disclosed in Japanese Patent Application Publication No. 11-203360 had a drawback that if the image supplier forgot to update a storage contract of image stored in an image management server, the stored image was automatically deleted from the image management server regardless of the image supplier's intention, when the storage period for the stored image expired.

In particular, it is a significant loss for the image supplier that the important image with high utilization factor is deleted from the image management server.

SUMMARY OF THE INVENTION

The present invention has been achieved in the light of the above-mentioned problems, and it is an object of the invention is to provide a service server which can be operated in a more practical rate structure by extending the storage period and/or reducing the recording fee for the information with high utilization factor, or increasing the recording fee for the information with low utilization factor among the information stored in the service server.

In order to accomplish the above object, the present invention is directed to a service server which receives information from a communication device on an information supplier side, and stores the received information and provides the received information to a communication device on an information demander side, the service server comprising: a receiving device which receives the information from the communication apparatus on the information supplier side; a first recording device which records the received information; a second recording device which records a recording fee as a cost of recording the recorded information; a first transmitting device which transmits the information recorded in the first recording device to the communication device on the information demander side upon an information service request from the information demander side; a counting device which counts an information service number from the information demander side; a third recording device which records the counted information service number to be associated with the information supplier or with the information and the information supplier; and a recording fee calculating device which calculates a new recording fee by changing the recording fee recorded in the second recording device in accordance with the information service number recorded in the third recording device and records the new recording fee in the second recording device.

According to the present invention, the service server comprises a receiving device which receives the information from the communication apparatus on the information supplier side, a first recording device which records the received information, a second recording device which records a recording fee as a recording cost of the recorded information, a first transmitting device which transmits the information recorded in the first recording device to the communication device on the information demander side upon an information service request from the information demander side, a counting device which counts the information service number from the information demander side, a third recording device which records the counted information service number to be associated with the information supplier or with the information and the information supplier, and a recording fee calculating device which calculates a new recording fee by reducing or increasing the recording fee recorded in the second recording device in accordance with the information service number recorded in the third recording device and records the new recording fee in the second recording device, whereby the service server can be operated in a more practical rate structure by extending the storage period and/or reducing the recording fee for the information with high utilization factor, or increasing the recording fee for the information with low utilization factor among the information stored in the service server.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The preferred embodiments of a service server according to the present invention will be described in detail below with reference to the accompanying drawings.

Figure 1:
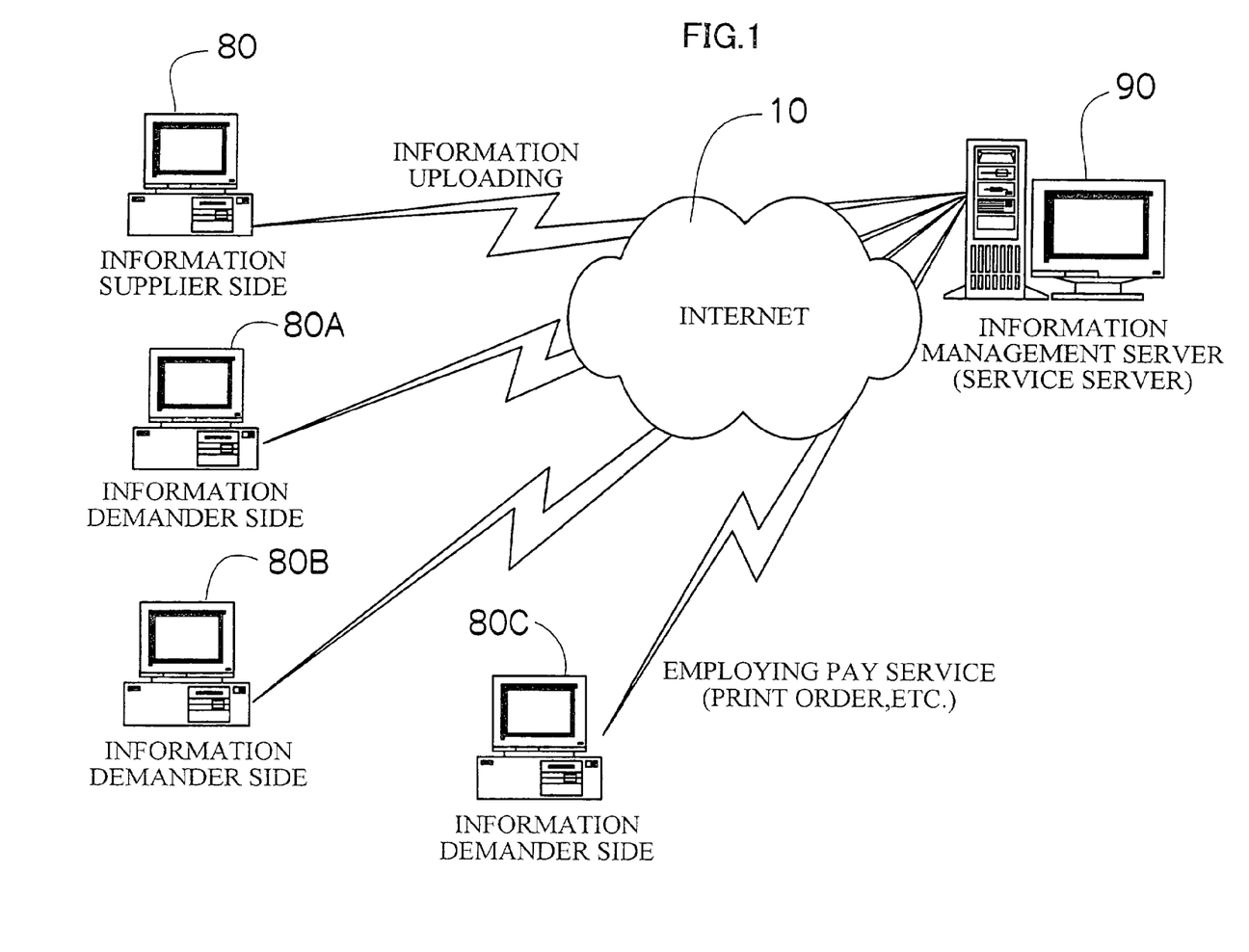
FIG. 1 is a diagram showing the configuration of an information management system containing a service server.

FIG. 1 is a diagram showing the configuration of an information management system containing a service server according to an embodiment of the present invention.

As shown in FIG. 1, the information management system is provided with a communication network 10 such as the Internet that serves as a path for transmitting and receiving the information of image, and an image management server 90 (service server) which stores, distributes, publicizes the information such as images and sound, and performs a conversion process including resizing the image, an image generating process, and a sales process including printing out the image.

Also, the information management system is provided with a personal computer (communication apparatus) 80 on an information supplier side to upload and sell the information, and personal computers 80A, 80B and 80C on information demander side to download and purchase the information, and order printing the image.

Figure 2:
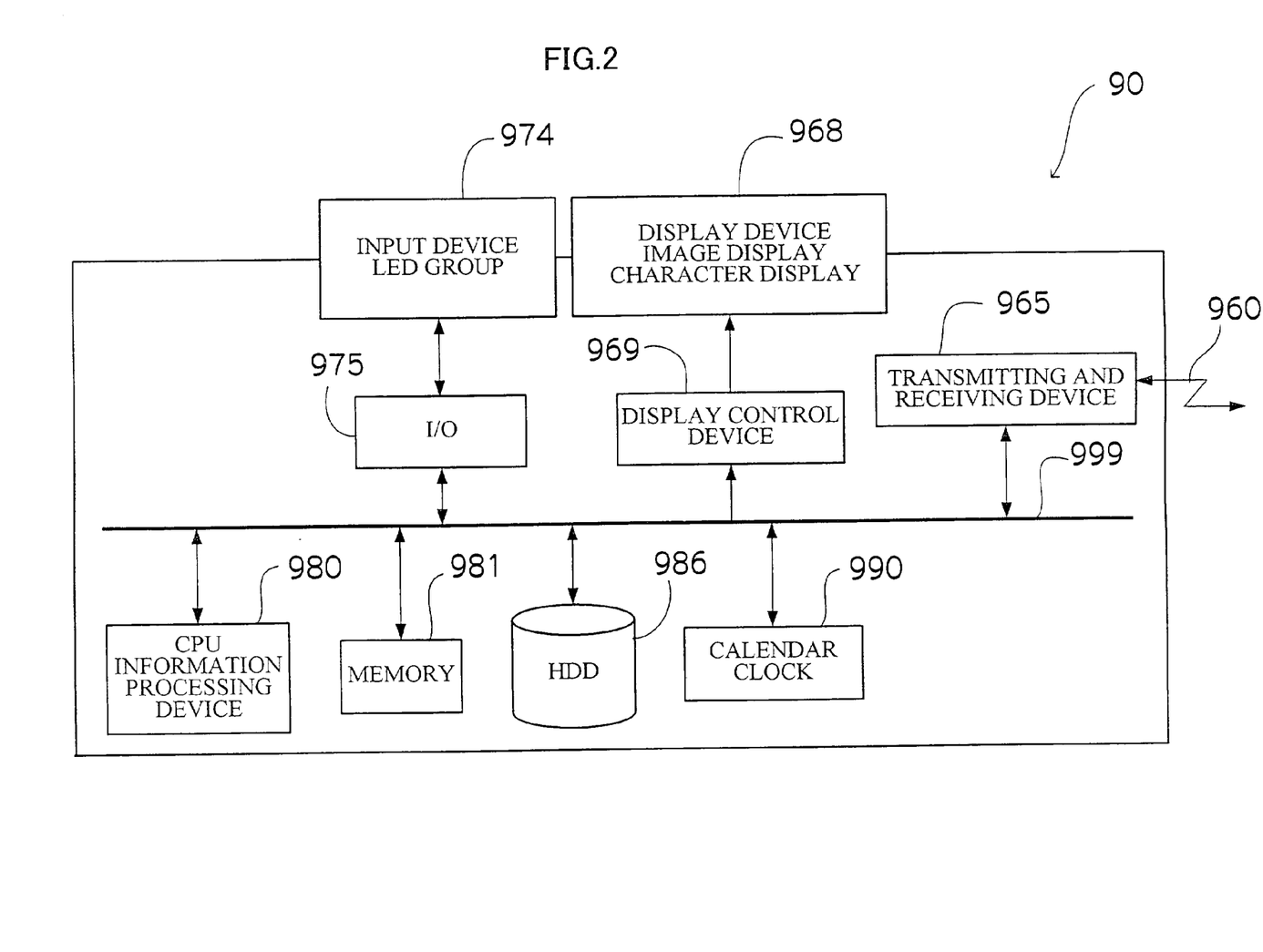
FIG. 2 is a block diagram of a signal processing system in the service server for information management.

FIG. 2 is a block diagram of a signal processing system in the service server for information management.

As shown in FIG. 2, an information transmitting and receiving section of the server 90 (service server) is provided with a transmitting and receiving device 965 (including the functions of a first transmitting device, a second transmitting device, a third transmitting device and a receiving device) to transmit or receive the information via the communication network 10 such as a public network 960 to or from another communication apparatus (personal computers 80, 80A, . . . ).

Also, the server 90 is provided with a display device 968 which displays the information of image or characters for confirmation, as needed, a display control device 969 which outputs an image signal for display to the display device 968 upon an instruction of an information processing device, and an I/O unit 975 which reads various sorts of information input by the administrator with an input device 974 and passes the read information to the information processing device, and outputs a display command to a notification device such as the LED upon an instruction of the information processing device.

Also, the server 90 is provided with the information processing device (CPU) 980 (having the functions of a counter and a recording fee calculator) which controls the entire server 90, a memory 981 composed of a ROM which stores the programs and various kinds of constants for operating the information processing device 980, and a RAM serving as a working area when the information processing device 980 performs the processing, a recording device 986 which stores in a relation various pieces of information, including various constants useful in the processing of the server 90, the self attribute information on the network, URL (Uniform Resource Locators), connection information such as address, site address, and gateway information DNS (Domain Name System), the image, the information regarding the uses of image, the recording fee and its billing information, the basic rate and its billing information, and various constants, and a calendar clock 990 which measures time.

The peripheral devices including the information processing device 980, the display control device 969, the I/O unit 975, the memory 981, the recording device 986 and the calendar clock 990 within the server 90 are connected via a bus 999, in which the information processing device 980 can control the peripheral devices in accordance with a processing program.

The server 90 receives the information of an image file or a sound file from the communication apparatus such as the personal computer 80 on the information supplier side which is connected via the communication network 10, and records and stores the received information in the recording device 986. The server 90 can provide the information of image stored in the recording device 986 via the communication network 10 to the communication apparatus on the general user side wishing to obtain the information.

The transmitting and receiving device 965 (receiving device) can receive the information of image file or sound file from the personal computer 80 (communication apparatus) on the information supplier side via the communication network 10 such as the Internet. The recording device 986 (first recording device) can record the received information of the transmitting and receiving device 965. Furthermore, the recording device 986 (second recording device) can record the recording fee as the recording cost of the recorded information.

Also, the transmitting and receiving device 965 (first transmitting device) can transmit the information recorded in the recording device 986 (first recording device) to the communication apparatus on the information demander side, upon an information service request from the information demander side wishing to employ the information of image recorded in the recording device 986 (first recording device).

Then, the information processing device 980 (counting device) counts the information service number from the information demander side. The information processing device 980 can record in the recording device 986 (third recording device) the counted information service number in association with the requested image and other information and the information supplier of the information.

The information processing device 980 (recording fee calculating device) can read the information service number recorded in the recording device 986 (third recording device), and make a calculation of reducing or increasing the recording fee recorded in the recording device 986 (second recording device) in accordance with the read information service number. Also, the new recording fee acquired from the calculation can be recorded in the recording device 986 (second recording device).

Also, the information processing device 980 can issue an instruction of reading the recording fee recorded in the recording device 986 (second recording device), and transmitting the read recording fee as billing information to the personal computer 80 (communication apparatus) on the information supplier side.

Also, the information processing device 980 can transmit the billing information via the transmitting and receiving device 965 (second transmitting device) to the communication apparatus for financial institution relevant with the information supplier.

Also, the information processing device 980 can read the information service number recorded in the recording device 986 (third recording device) and transmit the read information service number through the transmitting and receiving device 965 (third transmitting device) to the personal computer 80 (communication apparatus) on the information supplier side.

The information processing device 980 has a function of registering the information supplier and the information demander, a function of supplying the information of image file or sound file, a function of instructing the dealer to print the recorded image via the communication network 10 upon a request from the information demander, and other functions of changing the size of image (resizing function), generating the image and distributing the image.

Also, the server 90 has a function of printing the image recorded in the recording device 986 and delivering the printed image to the information demander, a function of publicizing the recorded image via the communication network 10 such as the Internet, a function of selling the image, a function of totaling the situation of applying various services such as distributing, delivering and selling the image, and a management function.

Also, the information processing device 980 has a function of restoring a benefit obtained by services such as selling the information of image or sound to the information supplier.

Figure 3:
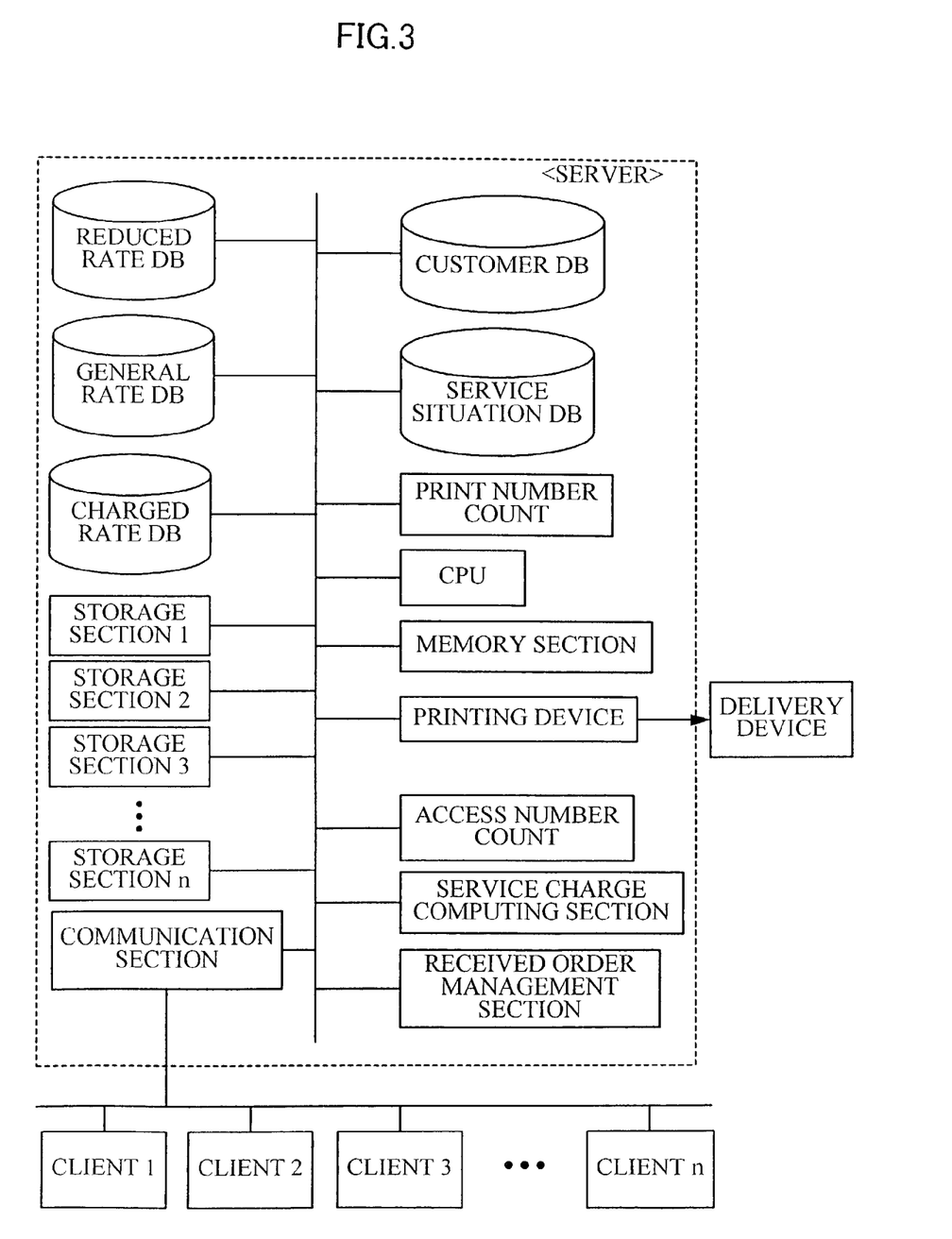
FIG. 3 is a diagram showing another configuration of the service server according to the invention.

FIG. 3 is a diagram showing another configuration of a server according to an embodiment of the present invention.

The recording device 986 can be divided into a reduced rate database, a general rate database, a charged rate database, a customer database, and a service situation database which stores the counted service number for each function, as shown in FIG. 3. Moreover, the recording device 986 can be divided into a storage section 1 which records the image file, a storage section 2 which records the sound file, and storage sections 3 to n which record other information in accordance with each use.

Also, the service server can be provided independently with a printing device which prints the image, a printing number counting section which counts the number of printing the image, an access number counting section (counting device) which counts the information service number from the information demander side, a service charge computing section (including the function of recording fee calculating device) which computes the new recording fee by reducing or increasing the recording fee in accordance with the information service number, and an order receiving management section which receives an order of delivering the print image, or distributing the image or sound.

Figure 4:
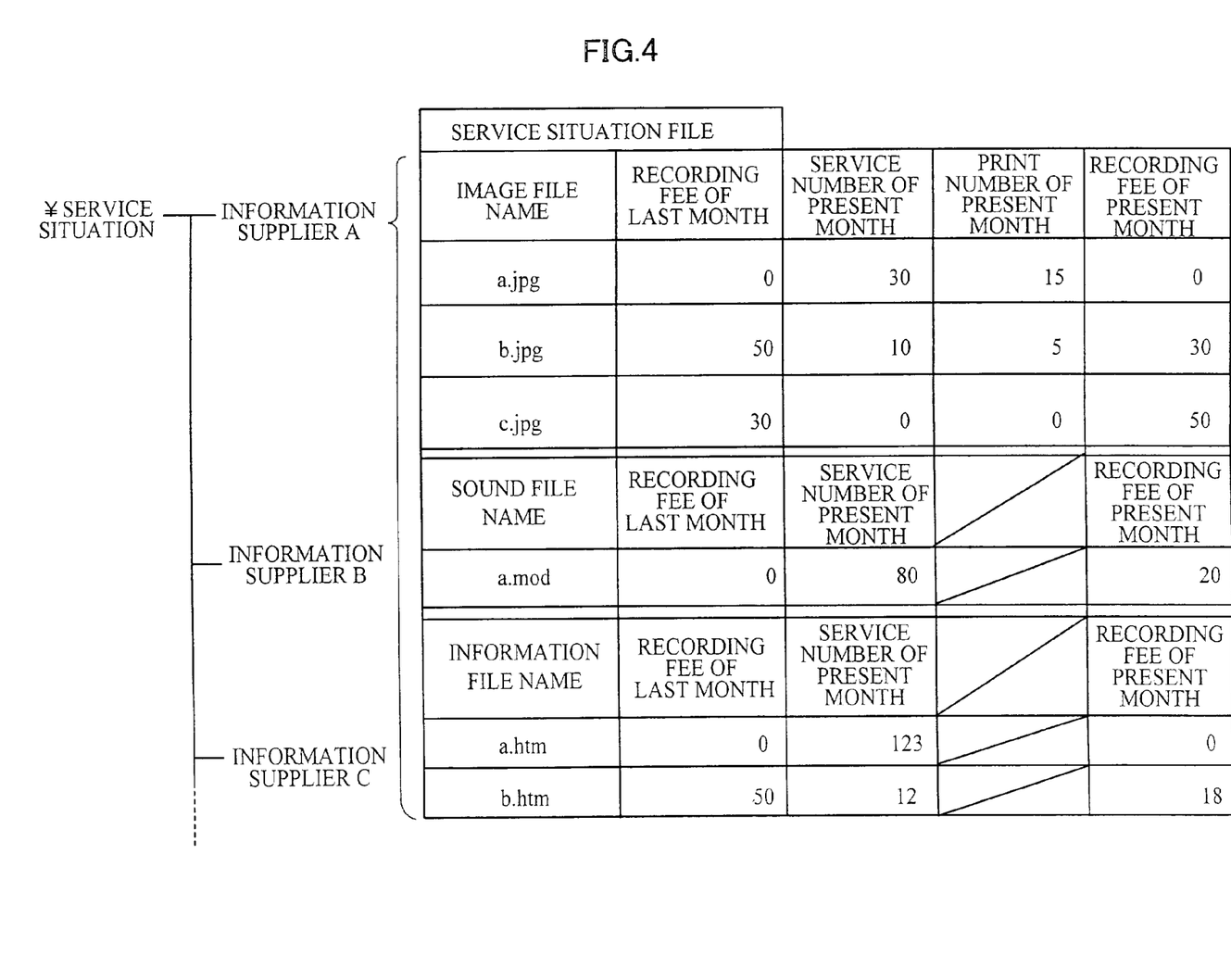
FIG. 4 is a table listing a service situation to be managed in the service server according to the invention.

FIG. 4 is a table of a service situation file which is managed in the service server according to an embodiment of the present invention.

The recording device 986 of the server 90 stores the information supplier and the information service situation relationally, as shown in FIG. 4.

For example, the service situation is recorded as a service situation file for each information supplier, such as an information supplier A, an information supplier B, an information supplier C, . . . The service situation file of the information supplier A stores the image file name recorded in the recording device 986, the recording fee of the image file of last month (service charge of the server 90), the number of using the image file of present month, the number of printing the image file, and the recording fee of the image file of present month relationally.

Also, the service situation file of the information supplier A stores the sound file name recorded in the recording device, the recording fee of the sound file of last month (service charge of the server 90) and the recording fee of the sound file of present month relationally.

Also, the service situation file of the information supplier A stores the information file name recorded in the recording device 986, the recording fee of the information file of last month (service charge of the server 90) and the recording fee of the information file of present month relationally. The total recording fee of the information supplier A can be a summation of the recording fee of image file, the recording fee of the sound file, and the recording fee of the information file.

A method for calculating the recording fee of image file name "b.jpg" of present month will be described below.

For example, assuming that the basic recording fee of one image per month S is equal to 50 cents/(sheet/month), a discount rate for every service number (Ab) of present month B is equal to 1 cent/service number, and a discount rate for every print number (Pb) of present month D is equal to 2 cents/print number, the service charge of one image of present month T is represented with the following formula (1).

$$T = S \times 1 \times 1 - B \times Ab - D \times Pb \text{(cent)} \quad (1)$$

$$= 50 - 10 - 10$$

$$= 30$$

where S: basic recording fee of image per month
(S=50 cents/(sheet/month))
Ab: service number of present month (ten times)

B: discount rate for every service number (Ab) of present month
(B=1 cent/service number)
Pb: print number of present month (five times)
D: discount rate for every print number (Pb) of present month (D=2 cents/print number)

As described above, substituting constants into the formula (1), the recording fee of the image file name "b.jpg" of present month is calculated as 30 cents. The basic charge S of image per month can take over the recording fee of last month.

A method for supplying the image by the use of the service server according to an embodiment of the present invention will be described below.

First of all, when the information supplier wants to supply the image to the server 90, the information supplier operates the personal computer 80 to connect to the server 90 via the communication network 10 such as the Internet.

If the communication between the personal computer 80 and the server 90 is established, the server 90 transmits a display file of the home page or other pages described in the HTML format, for example, to the personal computer 80 of the information supplier. In the personal computer 80 on the information supplier side which receives the display file, the received information of home page is displayed on the display device, and notified to the information supplier. At this time, a guide regarding the registration charge for the server 90 managing the image can be contained in the display file, and notified to the information supplier. Also, the server 90 can be connected to the personal computer 80B on the information demander side.

In the home page displayed in the communication apparatus on the information demander side, the buttons for instructing the acquisition of an image or sound file recorded in the recording device 986 of the server 90 can be provided. If the information demander instructs the acquisition of the image or sound file, the instructed information is transmitted to the server 90, and the information processing device 980 of the server 90 records the information indicating that the instructed image or sound file is selected in a log file, and transmits the instructed image or sound file to the communication apparatus on the user side. The information of the log file indicating that the image or sound file is selected can be referred to in counting the information service number of image in the server 90.

Figure 5:
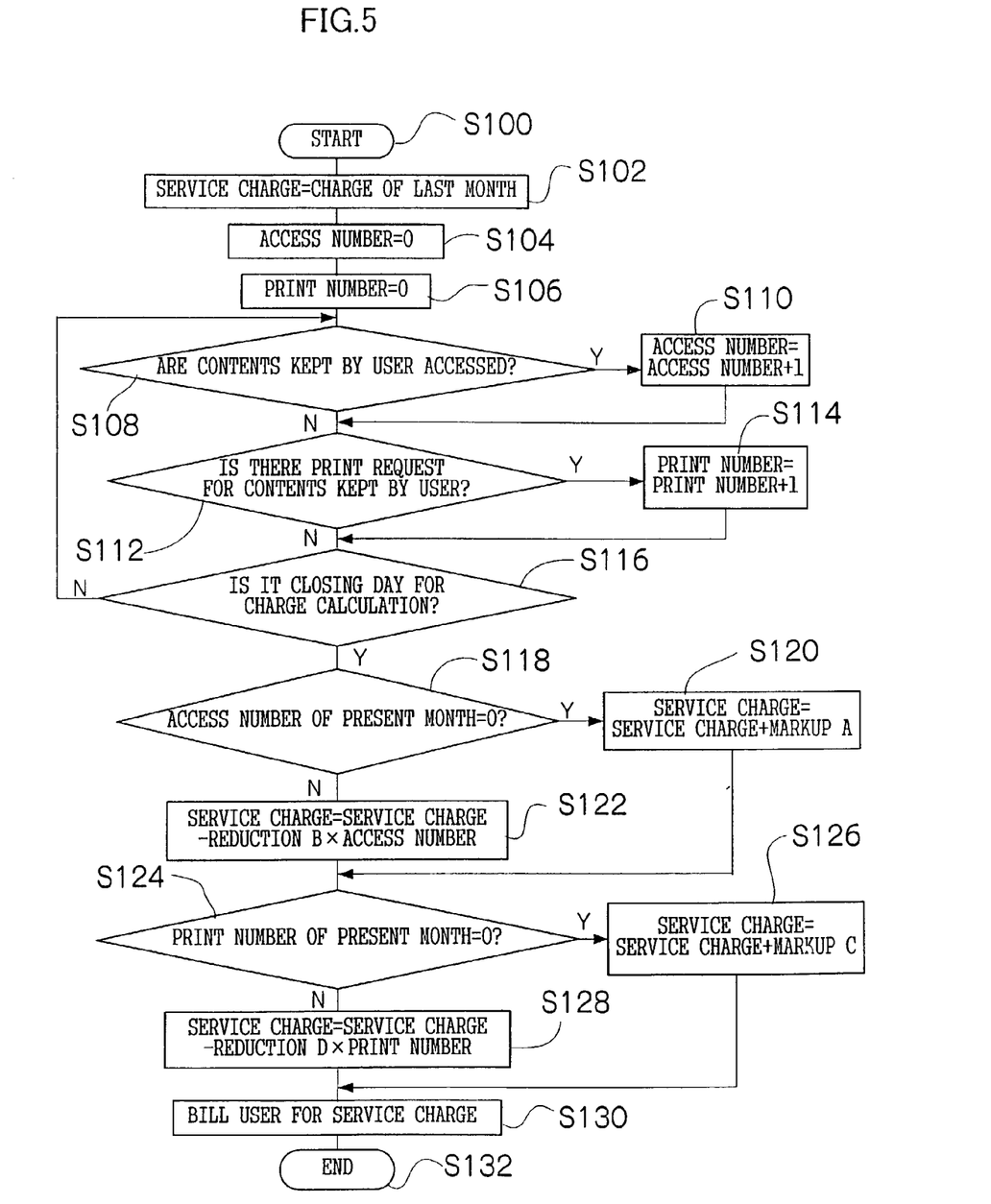
FIG. 5 is a flowchart of a recording fee calculation process to be performed by an information processing device of the service server.

FIG. 5 is a flowchart of a recording fee calculating process which is performed by the information processing device 980 of the server 90. In the flowchart shown in FIG. 5, a calculating process of the recording fee for a specific image recorded in the recording device 986 will be described below.

As shown in FIG. 5, when the information processing device 980 of the server 90 performs the calculation of the recording fee, the process branches to step S100 "START" (hereinafter abbreviated as S100) and goes to step S102 "service charge=charge of last month".

At step S102, the basic charge of image per month takes over the recording fee of last month (service charge). For example, at the beginning of month, the information processing device 980 substitutes the service charge of last month (recording fee of last month) into the service charge of present month (charge on which the recording fee of present month is based).

At step S104 "access number=0", at the beginning of month, for example, the initial value "0" of the access number (service number of present month) is substituted. At step S106 "print number=0", the initial value "0" of the print number (print number of present month) is substituted.

At step S108 "the contents kept by the user are accessed?", it is judged whether or not an information service request (access) for the image is made from the personal computer 80A or the like on the information demander side. If it is judged that the information service request for the image is made, the process performed by the information processing device 980 branches to step S110 "access number=access number+1".

At step S110, the information processing device 980 (counting device) reads the information service number of the image of present month recorded in the recording device 986 (third recording device) and adds one as the service number of this time. The counted service number of present month is then recorded in the recording device 986 (third recording device) again. After the service number is counted and the recording process is ended, the process goes to the judgment "Is there a print request for the contents kept by the user?" at step S112.

If it is judged at step S108 that there is no information service request for the image, the process performed by the information processing device 980 goes to step S112.

At step S112, it is judged whether or not there is a print request for the image from the personal computer 80A or the like on the information demander side. If it is judged that there is any print request for the image, the process performed by the information processing device 980 branches to step S114 "print number=print number+1".

At step S114, the information processing device 980 (counting device) reads the print number of the image of present month recorded in the recording device 986 (third recording device) and adds one as the service number for this time. The counted print number of present month is then recorded in the recording device 986 (third recording device) again. After the print number is counted and the recording process is ended, the process goes to step S116 for the judgment "Is it a closing day for charge calculation?".

If it is judged at step S112 that there is no print request for the image, the process performed by the information processing device 980 goes to step S116. At step S116, it is judged whether or not the current date is the closing day for summing up the recording fee of information.

If at step S116, it is judged that the current date is not the closing day for summing up the recording fee, the process performed by the information processing device 980 returns to step S108. If at step S116, it is judged that the current date is a closing day for summing up the recording fee, the process goes to the judgment at step S118 "access number of present month=0?".

At step S118, the information processing device 980 reads the service number (access number) of present month recorded in the recording device 986 (third recording device), and judges whether or not the access number of present month is equal to zero. If it is judged that the service number of present month is equal to zero, the process goes to step S120 "service charge=service charge+markup A". At step S120, the information processing device 980 reads the recording fee recorded in the recording device 986 (second recording device), and adds the predetermined markup A (cent). The information processing device 980 then records the service charge in the recording device 986 (second recording device) again. The markup A (cent) is the additional amount to the recording fee because the service number of the image is zero.

If it is judged at step S118 that the service number of present month is not zero, the process goes to step S122 "service charge=service charge−reduction B×access number". At step S122, the recording fee recorded in the recording device 986 (second recording device) is read, and the recording fee of present month is calculated on the basis of the service number in accordance with the formula 1, for example. The recording fee of present month is then recorded in the recording device 986 (second recording device) again.

After the recording fee is recorded at step S120 or S122, the process goes to the judgment at step S124 "print number of present month=0?".

At step S124, the information processing device 980 reads the print number of present month recorded in the recording device 986 (third recording device), and judges whether or not the print number of present month is equal to zero. If it is judged that the print number of present month is equal to zero, the process goes to step S126 "service charge=service charge+markup C". At step S126, the information processing device 980 reads the recording fee recorded in the recording device 986 (second recording device), and adds the predetermined markup C (cent). The information processing device 980 then records the recording fee in the recording device 986 (second recording device) again. The markup C (cent) is the additional amount to the recording fee because the print number of the image is zero.

If it is judged at step S124 that the print number of present month is not zero, the process goes to step S128 "service charge=service charge−reduction D×print number". At step S128, the recording fee recorded in the recording device 986 (second recording device) is read, and the recording fee of present month is calculated on the basis of the print number in accordance with the formula 1, for example. The recording fee of present month is then recorded in the recording device 986 (second recording device) again.

After the recording fee is recorded at step S126 or S128, the process goes to step S130 "bill the user for the service charge".

At step S130, the information processing device 980 reads the recording fee (service charge) recorded in the recording device 986 (second recording device), and makes an instruction of transmitting the read recording fee as billing information to the personal computer 80 (communication apparatus) on the information supplier side to the transmitting and receiving device 965. Then, the billing information is transmitted from the transmitting and receiving device 965 via the communication network 10 to the personal computer 80.

At step S130, the information processing device 980 can make an instruction of transmitting the billing information recorded in the recording device 986 (second recording device) to the communication apparatus (server) for financial institution relevant with the information supplier. Then, the billing information is transmitted from the transmitting and receiving device 965 via the communication network 10 to the communication apparatus for financial institution.

Also, at step S130, the information processing device 980 can read the information service number (information of service number of present month and print number of present month as indicated in FIG. 4) recorded in the recording device 986 (third recording device), and make an instruction of transmitting the read information service number to the personal computer 80 (communication apparatus) on the information supplier side to the transmitting and receiving device 965 (third transmitting device). Then, the information service number is transmitted from the transmitting and receiving device 965 via the communication network 10 to the personal computer 80.

After the billing information for the service fee is output at step S130, the process performed by the information processing device 980 goes to step S132 "END".

As described above, the service server according to the present invention comprises a receiving device which receives the information from the communication apparatus on the information supplier side, a first recording device which records the received information, a second recording device which records a recording fee as a recording cost of the recorded information, a first transmitting device which transmits the information recorded in the first recording device to the communication device on the information demander side upon an information service request from the information demander side, a counting device which counts the information service number from the information demander side, a third recording device which records the counted information service number to be associated with the information supplier or with the information and the information supplier, and a recording fee calculating device which calculates a new recording fee by reducing or increasing the recording fee recorded in the second recording device in accordance with the information service number recorded in the third recording device and records the new recording fee in the second recording device, whereby the service server can be operated in a more practical rate structure by extending the storage period and/or reducing the recording fee for the information with high utilization factor, or increasing the recording fee for the information with low utilization factor among the information stored in the service server.

According to the present invention, the information supplier who provides the superior information or contents with high utilization factor (more access number) is dealt with favorably for the service charge including the registration fee, while the information supplier who provides the information or contents with low utilization factor (less access number) is charged more than the standard registration fee, whereby the superior information or contents with high utilization factor can be increased, and the invaluable information or contents can be prevented from increasing without business. By virtue of the above effect, it is possible to relive the management burden of the service server and enhance the quality of the whole information service.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of receiving information from an information supplier, storing the received information and providing the received information to an information demander, the method comprising:
   receiving the information from the information supplier;
   storing the received information received from the information supplier for a predetermined time period such that the stored information itself may be later supplied to the information demander;
   transmitting the stored information to the information demander upon receiving an information service request from the information demander;
   counting an information service number from the information demander, the information service number tracking how many times the stored information is transmitted to the information demander in response to the information service requests;
   said counting step counting the information service number for the predetermined time period;
   recording the counted information service number to be associated with the information supplier; and
   extending a storage time of the stored information beyond the predetermined time period in accordance with the information service number.

\* \* \* \* \*